US012733027B2

(12) United States Patent
Matsumoto et al.

(10) Patent No.: US 12,733,027 B2
(45) Date of Patent: Sep. 8, 2026

(54) WIRELESS COMMUNICATION SYSTEM AND WIRELESS COMMUNICATION METHOD

(71) Applicant: DENSO CORPORATION, Kariya-city (JP)

(72) Inventors: Sho Matsumoto, Kariya-city (JP); Youichi Hayase, Kariya-city (JP); Yuto Honda, Kariya-city (JP); Tadashi Nakashima, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 384 days.

(21) Appl. No.: 18/437,358

(22) Filed: Feb. 9, 2024

(65) Prior Publication Data

US 2024/0284499 A1 Aug. 22, 2024

(30) Foreign Application Priority Data

Feb. 21, 2023 (JP) ................................ 2023-025465

(51) Int. Cl.
*H04W 72/542* (2023.01)
*H04W 72/541* (2023.01)

(52) U.S. Cl.
CPC ....... *H04W 72/542* (2023.01); *H04W 72/541* (2023.01)

(58) Field of Classification Search
CPC . H04W 72/542; H04W 72/541; H04W 24/08; H04B 17/309
See application file for complete search history.

(56) References Cited

U.S. PATENT DOCUMENTS

2006/0089149 A1 4/2006 Kizu et al.
2016/0198285 A1* 7/2016 Lin ........................ H04W 4/38 709/209
2021/0410050 A1* 12/2021 Liu ....................... H04W 24/10
(Continued)

FOREIGN PATENT DOCUMENTS

CN 101583881 B * 6/2012 ......... G01R 13/0236
JP 2018-121210 A 8/2018
WO 2015/189898 A1 12/2015

OTHER PUBLICATIONS

Translation of CN-101583881-B (Year: 2012).*

*Primary Examiner* — Rafael Pérez-Gutiérrez
*Assistant Examiner* — Gilbert M. Grant
(74) *Attorney, Agent, or Firm* — Posz Law Group, PLC

(57) ABSTRACT

A wireless communication system, which performs wireless communication between a master device and a slave device, is configured to: detect characteristic data indicating a communication quality of wireless communication for each communication channel; generate, for each communication channel, first evaluation data and second evaluation data, based on the detected characteristic data, the second evaluation data having a higher responsiveness to a change occurred in the characteristic data compared with the first evaluation data; determine deterioration of the communication quality for each communication channel based on the first evaluation data and the second evaluation data; decide one communication channel whose communication quality is determined to be deteriorated as a communication channel to be excluded from the multiple communication channels for performing the wireless communication.

19 Claims, 8 Drawing Sheets

(56) References Cited

U.S. PATENT DOCUMENTS

| | | | | |
|---|---|---|---|---|
| 2022/0141124 | A1* | 5/2022 | Takeshita | H04L 45/22 370/217 |
| 2023/0236658 | A1* | 7/2023 | Li | H01R 13/7036 713/323 |
| 2023/0388945 | A1 | 11/2023 | Matsumoto et al. | |

* cited by examiner

FIG. 1

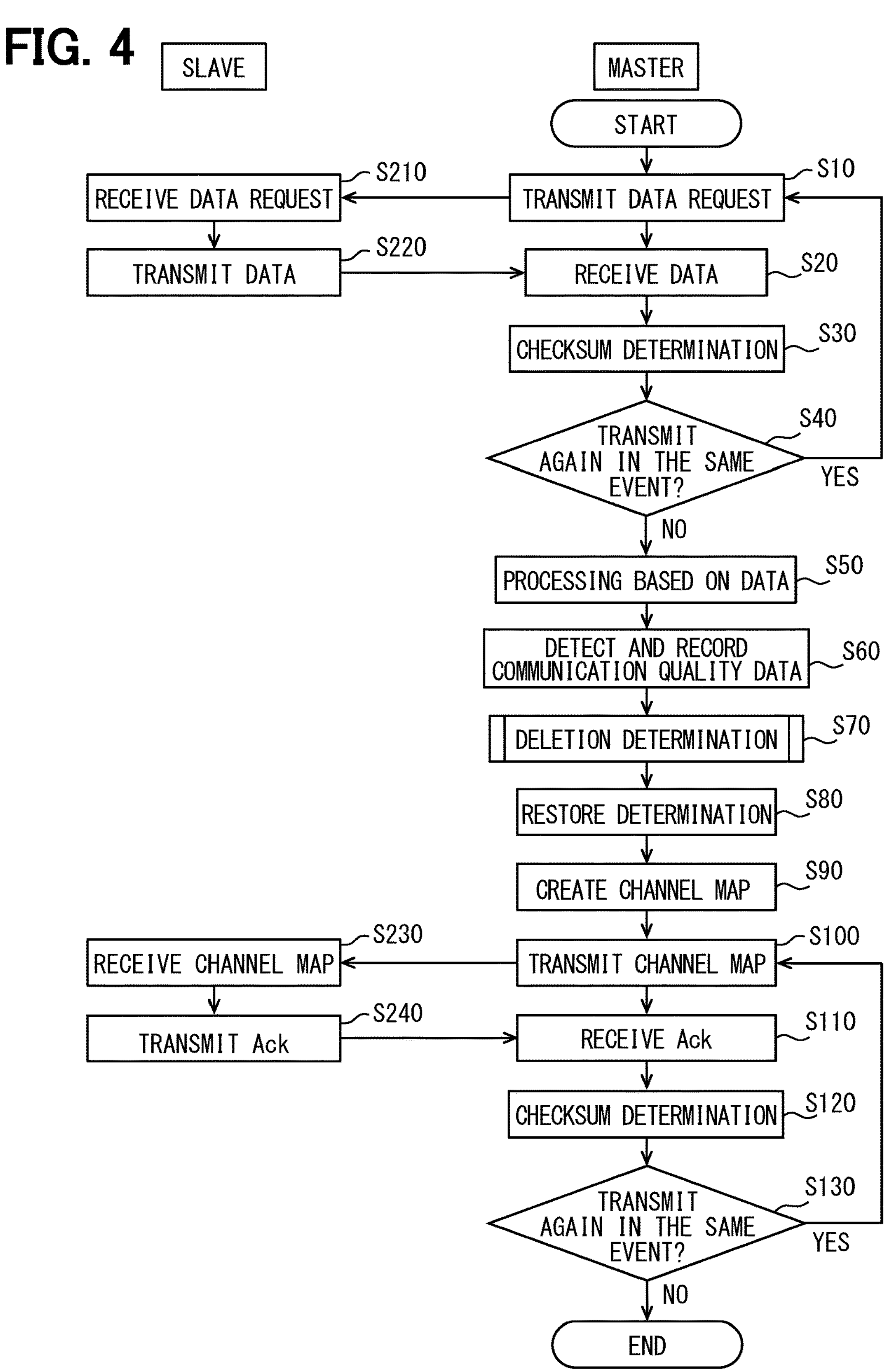
FIG. 4
SLAVE
MASTER
START
TRANSMIT DATA REQUEST
S10
RECEIVE DATA REQUEST
S210
TRANSMIT DATA
S220
RECEIVE DATA
S20
CHECKSUM DETERMINATION
S30
TRANSMIT AGAIN IN THE SAME EVENT?
S40
YES
NO
PROCESSING BASED ON DATA
S50
DETECT AND RECORD COMMUNICATION QUALITY DATA
S60
DELETION DETERMINATION
S70
RESTORE DETERMINATION
S80
CREATE CHANNEL MAP
S90
TRANSMIT CHANNEL MAP
S100
RECEIVE CHANNEL MAP
S230
TRANSMIT Ack
S240
RECEIVE Ack
S110
CHECKSUM DETERMINATION
S120
TRANSMIT AGAIN IN THE SAME EVENT?
S130
YES
NO
END

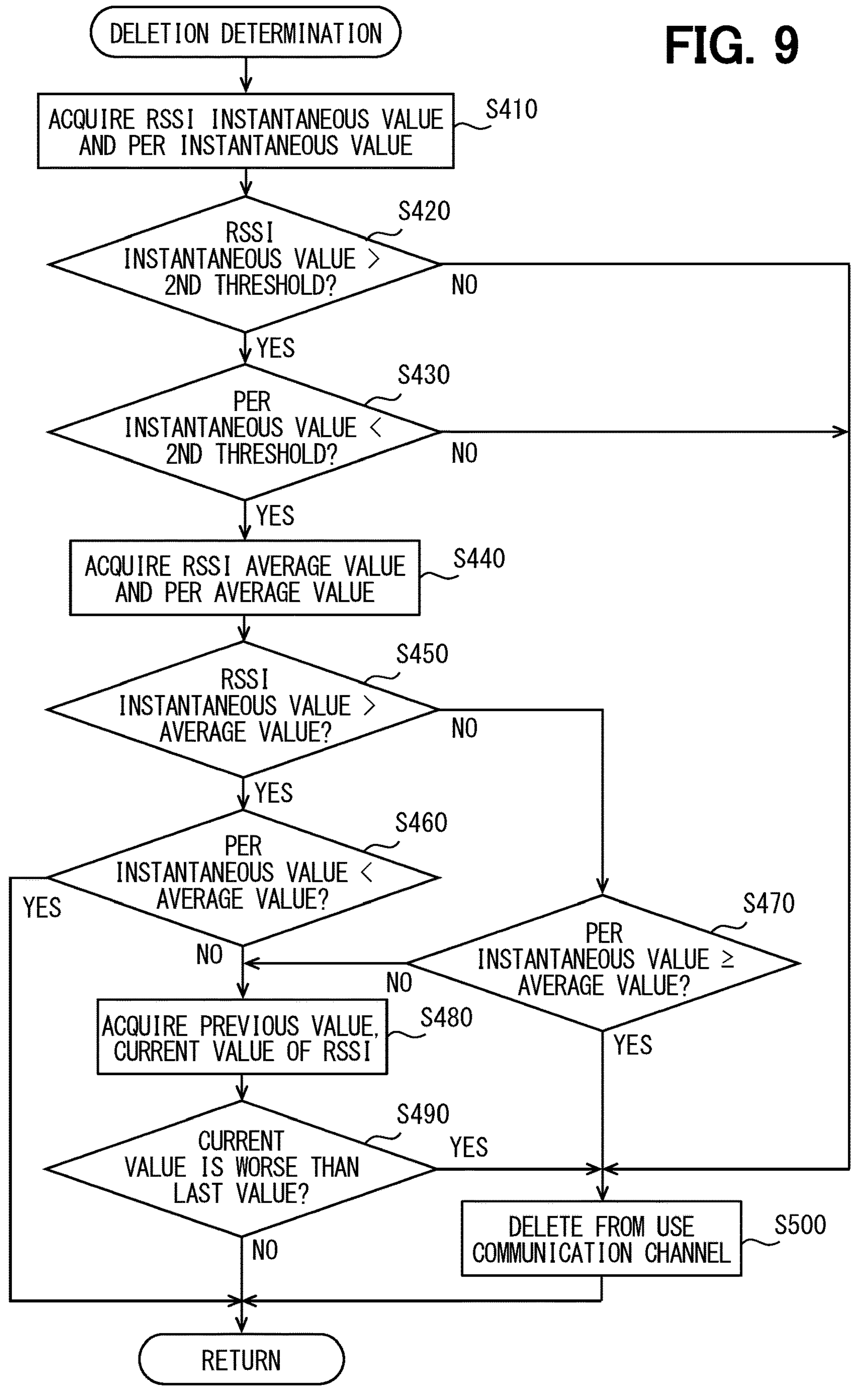
FIG. 9
DELETION DETERMINATION
ACQUIRE RSSI INSTANTANEOUS VALUE AND PER INSTANTANEOUS VALUE
S410
RSSI INSTANTANEOUS VALUE > 2ND THRESHOLD?
S420
NO
YES
PER INSTANTANEOUS VALUE < 2ND THRESHOLD?
S430
NO
YES
ACQUIRE RSSI AVERAGE VALUE AND PER AVERAGE VALUE
S440
RSSI INSTANTANEOUS VALUE > AVERAGE VALUE?
S450
NO
YES
PER INSTANTANEOUS VALUE < AVERAGE VALUE?
S460
YES
NO
PER INSTANTANEOUS VALUE ≥ AVERAGE VALUE?
S470
NO
YES
ACQUIRE PREVIOUS VALUE, CURRENT VALUE OF RSSI
S480
CURRENT VALUE IS WORSE THAN LAST VALUE?
S490
YES
NO
DELETE FROM USE COMMUNICATION CHANNEL
S500
RETURN

WIRELESS COMMUNICATION SYSTEM AND WIRELESS COMMUNICATION METHOD

CROSS REFERENCE TO RELATED APPLICATION

The present application claims the benefit of priority from Japanese Patent Application No. 2023-025465 filed on Feb. 21, 2023. The entire disclosure of the above application is incorporated herein by reference.

TECHNICAL FIELD

The present disclosure relates to a wireless communication system and a wireless communication method, each of which is used for executing a wireless communication between a master device and a slave device using a communication channel, which is sequentially selected from multiple communication channels.

BACKGROUND

Conventionally, in a wireless communication system, when a packet error occurs and the RSSI value of radio signal of the packet is greater than a preset threshold, the wireless communication system determines that the reception operation of the packet is a reception error due to interference with other radio waves.

SUMMARY

The present disclosure provides a wireless communication system and a method thereof. The wireless communication system performs a communication between a master device and a slave device using a communication channel, which is sequentially selected from multiple communication channels. The wireless communication system is configured to: detect characteristic data indicating a communication quality of the wireless communication for each of the multiple communication channels; generate, for each of the multiple communication channels, first evaluation data and second evaluation data, based on the detected characteristic data, the second evaluation data having a higher responsiveness to a change occurred in the characteristic data compared with the first evaluation data; determine deterioration of the communication quality for each of the multiple communication channels based on the generated first evaluation data and the generated second evaluation data, for each of the multiple communication channels, the communication quality is determined to be deteriorated in response to at least one of (i) a first condition indicating a predetermined deterioration of communication quality being satisfied in a determination based on the first evaluation data or (ii) a second condition indicating a greater deterioration of communication quality than the first condition being satisfied in a determination based on the second evaluation data; and decide one of the multiple communication channels whose communication quality is determined to be deteriorated, as a communication channel to be excluded from the multiple communication channels for performing the wireless communication.

BRIEF DESCRIPTION OF DRAWINGS

Objects, features and advantages of the present disclosure will become apparent from the following detailed description made with reference to the accompanying drawings. In the drawings:

FIG. 1 is a block diagram showing a schematic configuration of a wireless communication system according to a first embodiment of the present disclosure;

FIG. 4 is a flowchart showing a communication sequence between the master device and the slave device according to the first embodiment;

FIG. 9 is a flowchart showing a detailed example of a communication channel deletion determination process according to a second embodiment of the present disclosure.

DETAILED DESCRIPTION

Figure 2:
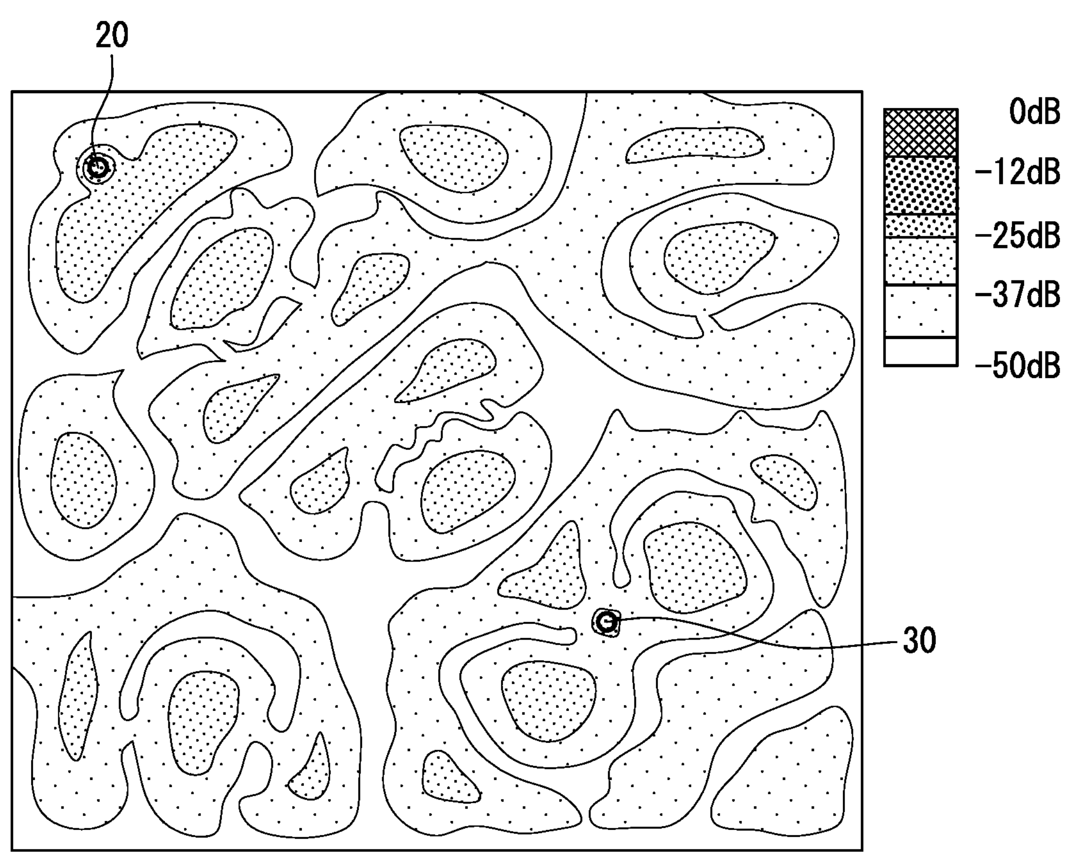
FIG. 2 is a diagram showing an example of electric field strength distribution of a communication environment between a master device and a slave device.

As described above, in a wireless communication system, when a packet error occurs and the RSSI value of radio signal of the packet is greater than a preset threshold, the wireless communication system determines that the reception operation of the packet is a reception error due to interference with other radio waves. Then, the number of receptions and the number of reception errors are counted, and the frequency of reception errors due to interference in each frequency channel (the number of reception errors/the number of receptions) is recorded. When the reception error frequency exceeds a preset threshold, it is determined that an interference source exists in the frequency channel in which the reception error frequency exceeds the threshold, and this frequency channel is recorded as an unusable channel.

In the above-described wireless communication system, only a frequency channel whose communication quality is degraded due to interference with other radio waves is set as an unusable channel.

However, in the wireless communication systems, interference with other radio waves is not always the only reason which affects the communication qualities of communication channels between the master device and the slave device. For example, a communication quality of one communication channel may be also affected by interference due to reflected waves of radio waves transmitted and received between the master device and the slave device. As a result of these interferences, an area having a high electric field strength and an area having a low electric field strength may be generated in a usage environment of the master device and the slave device. For example, regarding a distribution of electric field with respect to the master device, when the slave device is located in an area where the electric field strength is low or in the vicinity thereof, it is highly possible that the slave device may fail to correctly receive the wireless signals transmitted from the master device, and the communication quality may deteriorate. The electric field distribution between the master device and the slave device changes due to an external environment (noise from the outside or the like), vibration of the master device and/or the slave device, or the like.

According to an aspect of the present disclosure, a wireless communication system executes a wireless communication between a master device and a slave device using a communication channel, which is sequentially selected from multiple communication channels. The wireless communication system includes: a detection unit detecting characteristic data indicating a communication quality of the wireless communication for each of the multiple communication channels; an evaluation data generation unit generating, for each of the multiple communication channels, first evaluation data and second evaluation data, based on the characteristic data detected by the detection unit, the second evaluation data having a higher responsiveness to a change occurred in the characteristic data compared with the first evaluation data; a determination unit determining deterioration of the communication quality for each of the multiple communication channels based on the first evaluation data and the second evaluation data generated by the evaluation data generation unit; and a decision unit deciding one of the multiple communication channels whose communication quality is determined to be deteriorated by the determination unit as a communication channel to be excluded from the multiple communication channels for performing the wireless communication. The determination unit determines, for each of the multiple communication channels, that the communication quality is deteriorated in response to at least one of (i) a first condition indicating a predetermined deterioration of communication quality being satisfied in a determination based on the first evaluation data or (ii) a second condition indicating a greater deterioration of communication quality than the first condition being satisfied in a determination based on the second evaluation data.

According to another aspect of the present disclosure, a wireless communication method executes a wireless communication between a master device and a slave device using a communication channel, which is sequentially selected from multiple communication channels. The wireless communication method includes: detecting characteristic data indicating a communication quality of the wireless communication for each of the multiple communication channels; generating, for each of the multiple communication channels, first evaluation data and second evaluation data, based on the detected characteristic data, the second evaluation data having a higher responsiveness to a change occurred in the characteristic data compared with the first evaluation data; determining deterioration of the communication quality for each of the multiple communication channels based on the generated first evaluation data and the generated second evaluation data, for each of the multiple communication channels, the communication quality is determined to be deteriorated in response to at least one of (i) a first condition indicating a predetermined deterioration of communication quality being satisfied in a determination based on the first evaluation data or (ii) a second condition indicating a greater deterioration of communication quality than the first condition being satisfied in a determination based on the second evaluation data; and deciding one of the multiple communication channels whose communication quality is determined to be deteriorated, as a communication channel to be excluded from the multiple communication channels for performing the wireless communication.

In the wireless communication system and the wireless communication method described above, the first evaluation data and the second evaluation data are generated from the characteristic data indicating the communication quality of wireless communication that has been executed. The first evaluation data is based on multiple characteristic data, and the second evaluation data has a higher responsiveness to a change occurred in the characteristic data than the first evaluation data. Therefore, the first evaluation data indicates the communication quality of wireless communication in a more stable manner, and the second evaluation data indicates the communication quality of the wireless communication with good responsiveness.

In the wireless communication system and the wireless communication method described above, the communication quality of the communication channel is determined to be deteriorated in response to at least one of the first condition or the second condition being satisfied. The first condition indicates a predetermined deterioration in the communication quality by performing a determination based on the first evaluation data. The second condition indicates a deterioration in the communication quality larger than the first condition by performing a determination based on the second evaluation data. With the above-described configuration, it is possible to accurately determine the deterioration of communication quality due to various aspects, such as a case where the deterioration degree of communication quality is small but the deteriorated state continues for a while or a case where the communication quality rapidly deteriorates. Further, the wireless communication system can determine a communication channel whose communication quality has deteriorated with high accuracy. Further, with the above-described wireless communication system and the wireless communication method, the communication channel for which the communication quality is determined to be deteriorated can be excluded from the communication channels to be used for performing the wireless communication.

The following will describe embodiments of the present disclosure with reference to the drawings. Note that the same or similar components are denoted by the same reference symbols throughout the drawings, and description thereof may be omitted. In a case where only a part of the configuration is described in one embodiment, the configuration of another embodiment described earlier can be applied to the other part of the configuration. In addition to the combination of the configurations explicitly described in the description of each embodiment, the configurations of multiple embodiments may be partially combined even if not explicitly described as long as there is no difficulty in the combination.

First Embodiment

The wireless communication system of the present embodiment includes a master device and a slave device. At least one of the master device or the slave device can be used by being mounted on a moving object. Examples of the moving object include a vehicle such as an automobile or a railway vehicle, a flying object such as an electric vertical take-off and landing aircraft or a drone, a ship, a construction machine, or an agricultural machine.

As a specific application in a vehicle, the wireless communication system according to the present embodiment can be applied to, for example, a battery management system that manages a battery mounted as a battery pack in an electrically driven vehicle, such as an electric vehicle, a hybrid vehicle, or a plug-in hybrid vehicle. When applied to the battery management system, for example, the master device is connected to a battery control device, and the multiple slave devices are respectively connected to monitoring devices provided in multiple battery stacks constituting the battery pack. In this case, both of the master device and the slave device are mounted on the vehicle.

Each monitoring device provided for each battery stack acquires battery information, such as the voltage and current of each battery cell included in the corresponding battery stack and the temperature of corresponding battery stack, using various sensors or the like. Upon receiving data requesting battery information from the battery control device via the wireless communication system, each monitoring device transmits the acquired battery information to the battery control device via the wireless communication system. Based on the acquired battery information, the battery control device calculates a state of charge (SOC) of the entire battery stacks, drives a temperature adjusting mechanism in order to adjust a temperature of the battery pack to an appropriate range, and determines whether it is necessary to execute an equalization process for equalizing the voltages of the battery cells. In response to determining that the equalization process needs to be executed in at least one battery stack, the battery control device instructs, via the wireless communication system, the corresponding monitoring device to execute the equalization process. Each monitoring device performs a process of determining abnormality of various sensors or abnormality of its own operation, and transmits abnormality information to the battery control device via the wireless communication system when abnormality is determined.

The wireless communication system according to the present embodiment may be applied to a vehicle smart key system or a vehicle tire pressure monitoring system. When the master device is applied to the vehicle smart key system, the master device is mounted on the vehicle and is connected to a control device that controls locking and unlocking of a vehicle door and turning on and off of a drive source, such as an engine of the vehicle. The multiple slave devices are mounted on portable keys or portable terminals carried by multiple users. When the master device is applied to the vehicle tire pressure monitoring system, the master device is mounted on the vehicle, and is connected to a control device, which displays the tire pressure and outputs a warning in response to the tire pressure being abnormal. The multiple slave devices each is disposed in each tire of the vehicle, and is connected to an air pressure detection device that is disposed in corresponding tire. The wireless communication system according to the present embodiment may be applied to a vehicle diagnosis system. In this case, for example, multiple slave devices are connected to multiple vehicle devices each having a self-diagnosis function, and the master device is connected to a diagnosis control device disposed in a service factory. In these examples, (i) the master device or (ii) the multiple slave devices is disposed at a fixed position and/or mounted on the vehicle.

The application examples of the wireless communication system according to the present embodiment are not limited to a vehicle. As described above, the wireless communication system can also be applied to a system that controls and manages various equipment such as a moving object other than a vehicle, for example, a flying object such as a drone, a ship, a construction machine, or an agricultural machine. The wireless communication system according to the present embodiment can also be applied to a system that performs control and management, such as a system performing control and management to equipment installed to a building or a system performing control and management to equipment installed in a factory.

Figure 1:
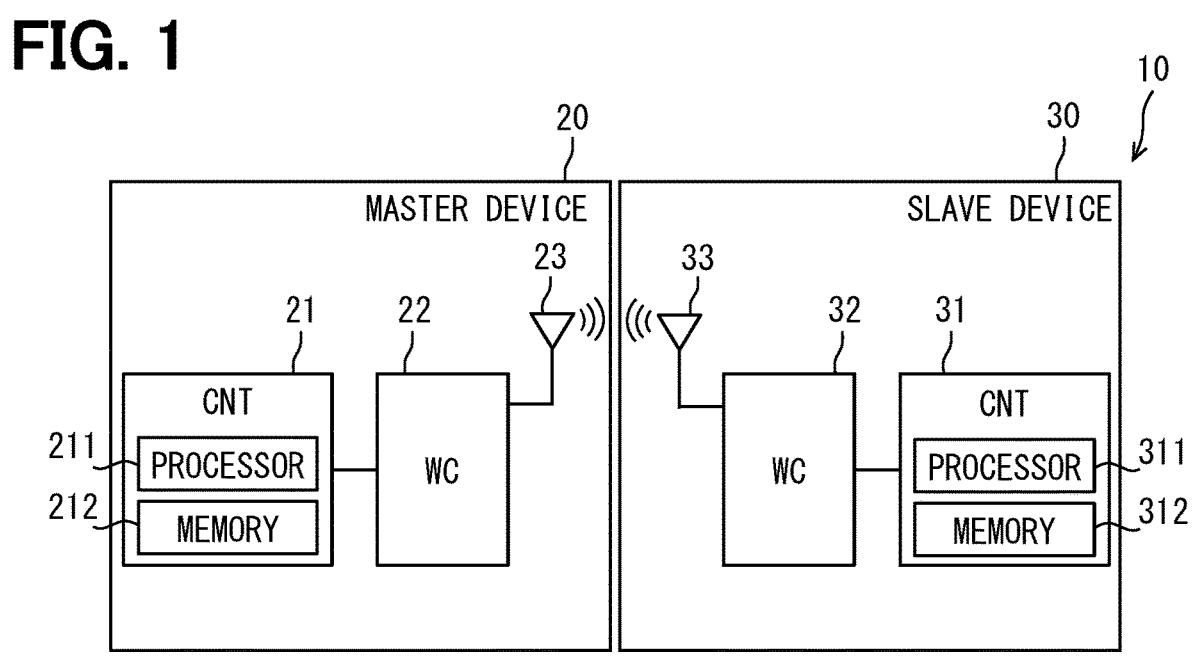

FIG. 1 is a block diagram illustrating a schematic configuration of a wireless communication system 10. The wireless communication system 10 includes a master device 20 and a slave device 30, both of which are mounted on, for example, a vehicle (automobile). The master device 20 and the slave device 30 may be configured to be arranged in a common housing, or may be configured to be arranged in different housings. The number of master devices 20 may be one or more. Similarly, the number of slave devices 30 may be one or more. The master device 20 and the slave device 30 perform wireless communication via a communication channel, which is sequentially selected from multiple communication channels, under Bluetooth Low Energy (Bluetooth is a registered trademark, hereinafter referred to as Bluetooth LE) communication.

As an example, the wireless communication system 10 of the present embodiment includes one master device 20 and multiple slave devices 30. In FIG. 1, only one slave device 30 is illustrated in for simplicity of illustration. The multiple slave devices 30 may have the same configuration.

In the wireless communication between the master device 20 and the slave device 30, a frequency band used in short range communication, for example, a 2.4 GHz band or a 5 GHz band can be used. Such radio waves in the high frequency band have higher straightness than radio waves in the low frequency band, and are likely to be reflected by a metal body such as a vehicle body. Hereinafter, LF is used as an abbreviation for Low Frequency. For example, Bluetooth, Bluetooth LE, or the like can be adopted as the short range communication standard. As an example, the master device 20 and the slave device 30 of the present embodiment are capable of performing wireless communication under the Bluetooth LE standard (hereinafter, Bluetooth LE communication). Details of the communication method related to the communication connection, the encrypted communication, and the like are performed according to a sequence defined by the Bluetooth LE standard.

As illustrated in FIG. 1, the master device 20 includes a control circuit (CNT) 21, a wireless communication circuit (WC) 22, and an antenna 23. The master device 20 may further include an input/output interface and a bus line for communicating with devices other than the slave device 30 in a wired or wireless manner.

The control circuit 21 includes, for example, a processor 211 and a memory 212. The memory 212 includes, for example, a RAM and a ROM. RAM is an abbreviation for Random Access Memory. ROM is an abbreviation for Read Only Memory.

In the control circuit 21, the processor 211 executes a predetermined process (control) by executing program code stored in the ROM by using the RAM as a temporary storage area. The processor 211 configures multiple functional units by executing multiple instructions included in the program. The program storage medium is not limited to the ROM. For example, various storage medium such as an HDD or an SSD may be used. HDD is an abbreviation for Hard Disk Drive. SSD is an abbreviation for Solid State Drive.

The processor 211 is, for example, a CPU, an MPU, a GPU, or a DFP. CPU is an abbreviation for Central Processing Unit. MPU is an abbreviation for Micro-Processing Unit. GPU is an abbreviation for Graphics Processing Unit. DFP is an abbreviation for Data Flow Processor. The control circuit 21 may be implemented by properly combining multiple types of arithmetic processing devices such as CPU, MPU, and GPU.

The control circuit 21 may be implemented as an SoC. SoC is an abbreviation for System on Chip. The control circuit 21 may be implemented by using an ASIC or an FPGA. ASIC is an abbreviation for Application Specific Integrated Circuit. FPGA is an abbreviation for Field-Programmable Gate Array.

The control circuit 21 generates a command for requesting the slave device 30 to perform process (for example, a command for requesting data, a command for requesting execution of predetermined process, or the like), and transmits transmission data including the command to the wireless communication circuit 22 as a transmission packet. The control circuit 21 receives a packet transmitted from the slave device 30 and executes a predetermined process based on data included in the received packet. The wireless communication performed by the master device 20 and the slave device 30 is packet communication.

The wireless communication circuit 22 includes an RF circuit (not shown) for wirelessly transmitting and receiving packets. The wireless communication circuit 22 has a transmission function of modulating a transmission signal and oscillating the signal at a frequency of an RF signal. The wireless communication circuit 22 has a reception function of demodulating a received signal. RF is an abbreviation for radio frequency.

The wireless communication circuit 22 modulates the packet including the data transmitted from the control circuit 21, and transmits the modulated packet to the slave device 30 via the antenna 23. The control circuit 21 outputs, to the wireless communication circuit 22, data obtained by encrypting transmission data such as battery information request data using encryption information. The encryption information is exchanged in connection establishment process described later. The wireless communication circuit 22 adds data necessary for wireless communication such as communication control information to the transmission packet and transmits the transmission packet. The data necessary for wireless communication includes, for example, an identifier (ID), a sequence number, a next sequence number, and an error detection code. The wireless communication circuit 22 may control a data size, a communication format, a schedule, error detection, and the like of communication between the master device 20 and the slave device 30. The control circuit may perform a control related to the above-described communication.

The wireless communication circuit 22 receives the packet transmitted from the slave device 30 via the antenna 23, and then demodulates the received packet. Then, the demodulated packet is transmitted to the control circuit 21. The antenna 23 converts the electric signal into a radio wave and radiates the radio wave into space. The antenna 23 also receives a radio wave propagated through space and converts the received radio wave into an electric signal.

As illustrated in FIG. 1, the slave device 30 includes a control circuit (CNT) 31, a wireless communication circuit (WC) 32, and an antenna 33. The slave device 30 may further include an input/output interface and a bus line for wired or wireless communication with devices other than the master device 20. The control circuit 31 has similar configuration to the control circuit 21 of the master device 20. The control circuit 31 includes, for example, a processor 311 and a memory 312. The memory 312 includes, for example, a RAM and a ROM.

The control circuit 31 executes requested process (response process such as acquiring and returning requested data, execution of requested process and the like) based on a request command acquired via the wireless communication circuit 32. For example, when the request command included in the received data is a transmission request for battery information, the control circuit 31 of the slave device 30 transmits the transmission request to the monitoring device of the corresponding battery stack and acquires the battery information from the monitoring device. Then, the control circuit 31 transmits, as a response to the request, data encrypted using the encryption information and including the processing result (for example, the acquired battery information) to the wireless communication circuit 32. The control circuit 31 can also execute control of devices mounted on the vehicle, for example, in accordance with the requested process.

The wireless communication circuit 32 includes an RF circuit (not shown) for wirelessly transmitting and receiving packets. Similar to the wireless communication circuit 22, the wireless communication circuit 32 has a transmission function and a reception function. The wireless communication circuit 32 receives the packet transmitted from the master device 20 via the antenna 33 and demodulates the received packet. Data included in the demodulated packet is transmitted to the control circuit 31. The wireless communication circuit 32 modulates the packet including the data transmitted from the control circuit 31, and transmits the modulated packet to the master device 20 via the antenna 33. The wireless communication circuit 32 adds data necessary for wireless communication such as communication control information to the transmission packet, and then transmits the transmission packet.

The wireless communication circuit 32 may control a data size, a communication format, a schedule, error detection, and the like of communication between the master device 20 and the slave device 30. The control circuit 31 may perform a control related to the above-described communication. The antenna 33 converts the electric signal into a radio wave, and radiates the radio wave into space. The antenna 33 receives a radio wave propagated through space, and then converts the received radio wave into an electric signal.

FIG. 2 is a diagram illustrating an example of electric field strength distribution in a communication environment between the master device 20 and the slave device 30. FIG. 2 shows an electromagnetic field simulation result at a predetermined timing at a predetermined frequency. Hereinafter, the electric field strength distribution may be referred to as an electric field distribution.

The master device 20 and the slave device 30 are disposed at predetermined positions in the vehicle. When radio wave signals of predetermined frequency are transmitted from the master device 20 disposed at the predetermined position and the slave device 30 disposed at the predetermined position, an area having a high electric field strength and an area having a low electric field strength are generated in a use environment due to interference between a transmission wave and a reflected wave or interference with external noise. The reflected wave is generated by reflection of radio wave on a metal element of the vehicle existing around the master device 20 and the slave device 30. For example, reflection on a vehicle body, reflection on a metal housing, reflection on a harness, or the like may generate the reflected wave. For this reason, in the communication environment between the master device 20 and the slave device 30, as shown in FIG. 2, multiple NULL points may be generated. The NULL point is a point where the electric field strength is high or low.

In the electric field distribution with respect to the master device 20, when the slave device 30 is located in an area where the electric field strength is low or in the vicinity thereof, there is a high possibility that the slave device 30 cannot correctly receive the wireless signal transmitted from the master device 20, and a communication error may occur. A communication channel in which such a communication error is likely to occur corresponds to a communication channel in which the communication quality is degraded.

When the master device 20 and the slave device 30 execute wireless communication via one communication channel, which is sequentially selected from multiple communication channels, since the frequencies of the respective communication channels are different, the electric field distribution of each communication channel may change accordingly. As a result, the communication quality may vary among the multiple communication channels.

Figure 3:
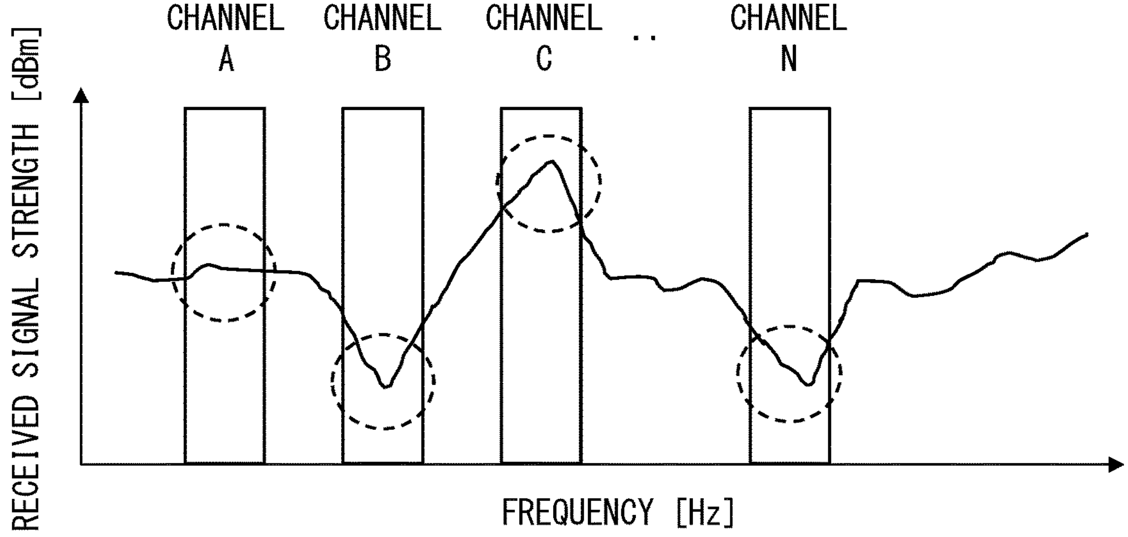
FIG. 3 is a diagram showing an example of received signal strength of each communication channel.

For example, as shown in FIG. 3, in the wireless communication using the communication channel A, the received power (received signal strength), which is one of the parameters indicating the communication quality, is sufficiently large. In the wireless communication using the communication channel C, the reception power indicates a very high value. Therefore, when the master device 20 and the slave device 30 use the communication channels A and C having high or very high communication quality, the master device 20 and the slave device 30 can perform high-quality wireless communication in which communication errors are sufficiently suppressed. On the other hand, in the wireless communication using the communication channels B and N, the reception power is low. For this reason, when the master device 20 and the slave device 30 use the communication channels B and N whose communication quality are low, an occurrence possibility of communication error in wireless communication may increase. In FIG. 3, to facilitate understanding, an example of the received signal strength with respect to the frequency is indicated by a solid line.

The wireless communication between the master device 20 and the slave device 30 may be performed by using a communication channel capable of performing high-quality wireless communication while avoiding use of a communication channel whose communication quality is low.

The electric field distribution between the master device 20 and the slave device 30 changes due to an external environment (noise from the outside or the like), vibration of the master device 20 and/or the slave device 30 (including vibration of a harness), or the like. Therefore, when the master device 20 and the slave device 30 are mounted on the vehicle, the electric field distribution of the communication environment between the master device 20 and the slave device 30 changes according to, for example, the vibration of the vehicle, the state of the surrounding environment of the vehicle, or the like. As a result, the communication channel with high communication quality and the communication channel with low communication quality are not fixed channels and may change every moment. In a case where the communication quality of each communication channel is rapidly deteriorated or in a case where the degree of the deterioration of the communication quality is small but the deteriorated state continues for a while, it is required to detect the deterioration of communication quality with high accuracy and set the communication channel having deteriorated communication quality as an unusable communication channel to be avoided from being used, regardless of various reasons of the deterioration of communication quality.

In the wireless communication system 10 of the present embodiment, a control process for detecting a communication channel whose communication quality is deteriorated and a wireless communication between the master device 20 and the slave device 30 using a communication channel other than the communication channel whose communication quality is deteriorated will be described with reference to a diagram illustrating a communication sequence between the master device 20 and the slave device 30 as illustrated in FIG. 4. In FIG. 4, the master device 20 is denoted by MASTER, and the slave device 30 is denoted by SLAVE.

First, the master device 20 and the slave device 30 execute a connection establishment process before executing the communication sequence illustrated in FIG. 2. For example, in a case where the wireless communication system 10 is mounted on a vehicle, the connection establishment process is executed when the IG signal is switched from OFF to ON by a user operation. This connection establishment process is executed between the master device 20 and all of the slave devices 30, which correspond to connection targets of wireless communication with the master device 20. When a constant connection is required between the master device 20 and the slave device 30, the connection establishment process is performed only once at a predetermined time. When an error occurs during communication and the wireless communication connection between the master device 20 and the slave device 30 is disconnected, a connection establishment process may be performed for reconnection.

In the connection establishment process, the slave device 30 may execute an advertising operation of transmitting an advertising signal via a communication channel for advertising purpose, and the master device 20 may execute a scanning operation for scanning the advertising signal. The communication channel for advertising includes multiple (for example, three in the case of Bluetooth LE) communication channels, which correspond to first channel group. When the master device 20 receives the advertising signal by performing the scanning operation, the master device 20 transmits a connection request to the corresponding slave device 30 that has transmitted the advertising signal. Accordingly, a communication connection is established between the master device 20 and the slave device 30. After the communication connection is established, the master device 20 and the slave device 30 exchange encryption information and perform a sharing process of initial information related to frequency channel hopping. The initial information may include a hopping pattern or a function related to hopping.

When the connection establishment process ends, in each communication event that occurs periodically, the master device 20 and the slave device 30 execute data communication using a data communication channel (corresponding to second channel group), which is sequentially selected from multiple communication channels. In Bluetooth LE standard, 37 communication channels are prepared as data communication channels. Specifically, as illustrated in FIG. 4, in S10, the master device 20 transmits a data request command, that is, a data request, to the slave device 30. When the slave device 30 receives the data request in S210, the slave device 30 executes, in S220, a predetermined process necessary for responding, that is, a process of acquiring and transmitting the requested data.

The master device 20 and the slave device 30 perform frequency channel hopping for each communication event to switch the communication channel to be used for data communication, and perform transmission and reception of a data request and transmission and reception of requested data. At this time, the master device 20 and the slave device 30 determine a communication channel to be switched by frequency channel hopping according to a channel map. The channel map will be described later.

In S20, the master device 20 receives the requested data. Then, in S30, the master device 20 performs, for example, checksum determination based on the error detection code included in the received data in order to confirm whether the data has been correctly received. In subsequent S40, when it is determined in the process of S30 that the data is not correctly received, the master device 20 determines whether to execute a process for retransmission of data in the same communication event. For example, the master device 20 may determine execution of retransmission when there is enough time to perform retransmission until the end time of the current communication event, and may determine non-execution of retransmission when there is no enough time until the end time of the current communication event. In S40, when the master device 20 determines to execute the retransmission, the master device 20 executes the process from S10 again. When the data is determined to be correctly received in S30 or the retransmission of data is determined to be not executed within the current communication event in S40, the master device 20 proceeds to S50.

In S50, the master device 20 executes a process based on the information included in the received data. When the data is determined to be not correctly received in S30 and the retransmission of data is determined to be not executed within the current communication event in S40, the master device may omit S50 or execute S50 based on the previously received data.

In S60, the master device 20 detects the received signal strength indicator (RSSI) and the packet error rate (PER) as the characteristic data indicating the communication quality of the signal received from the slave device 30. The PER indicates a ratio of the number of error packets to the number of received packets received by master device 20 in percentage. The master device 20 may detect signal noise ratio (SNR)/signal interference noise ratio (SINR), instead of the RSSI. The SNR/SINR may be detected by, for example, a ratio between an RSSI value when the master device 20 receives a radio signal from the slave device 30 and an RSSI value when the master device 20 does not receive a radio signal. The master device 20 may detect a bit error rate (BER) instead of the PER. The master device 20 stores and accumulates the detected RSSI or SNR/SINR, and PER or BER, for each communication channel. In addition to or instead of the detection by the master device 20 as described above, the characteristic data indicating the communication quality may also be acquired by the slave device 30. The slave device 30 may detect an RSSI, a PER, or the like from a received signal transmitted from the master device 20, and transmit the detected RSSI, the PER, or the like to the master device 20.

In S70, the master device 20 determines a decrease in communication quality of the communication channel based on the characteristic data indicating the communication quality detected in S60. Then, the communication channel whose communication quality is determined to be degraded is excluded from the communication channels to be used for the wireless communication between the master device 20 and the slave device 30. The excluded communication channel is a communication channel for data. With this configuration, the communication channel whose communication quality has deteriorated is deleted from the communication channels to be used for wireless communication. This communication channel deletion determination process will be described in detail later.

In S80, the master device 20 executes a restoration determination of the communication channel deleted by the deletion determination process in the past communication events. In the restoration determination, the deleted communication channel may be restored as the communication channel to be used for the wireless communication, for example, in response to a lapse of predetermined time from the deletion of communication channel. Alternatively, the deleted communication channel may be restored as a communication channel to be used for wireless communication when a communication channel adjacent to the deleted communication channel exhibits high communication quality. In this way, the communication channel determined to be restored as the communication channel to be used for the wireless communication can be actually used for the wireless communication between the master device 20 and the slave device 30. When the communication quality of restored communication channel remains low quality at the time of actual use for the wireless communication, the communication channel may be deleted again.

In S90, the master device 20 creates a channel map based on the results of the deletion determination in S70 and the restoration determination in S80. The channel map may indicate communication channels that can be used for wireless communication, or may indicate communication channels that cannot be used for wireless communication. Alternatively, both the usable communication channels and the unusable communication channels may be indicated in the channel map. When there is a change in usable/unusable communication channels due to the creation of the channel map, the frequency channel hopping pattern may be updated. When the frequency channel hopping pattern is not updated or when the communication channel to be hopped cannot be used, the communication channel to be hopped for next communication event may be used.

In S100, the master device 20 transmits the created channel map to the slave device 30. In S230, the slave device 30 receives the channel map transmitted from the master device 20. In S240, the slave device 30 returns a reception confirmation signal (Ack signal) to the master device 20. In S110, the master device 20 receives the Ack signal transmitted from the slave device 30. In S120, the master device 20 performs, for example, checksum determination based on the error detection code included in the received Ack signal in order to confirm whether the Ack signal has been correctly received. In subsequent S130, when it is determined in S120 that the data is not correctly received, the master device 20 determines whether to execute a process for retransmission in the same communication event. In S130, when the master device 20 determines to perform retransmission, the master device 20 executes the process from S100 again. When it is determined that the data is correctly received in S120 or when it is determined that the retransmission is not performed in S130, the master device 20 ends the process illustrated in the flowchart of FIG. 4.

With above-described process, the master device 20 and the slave device 30 can share the channel map. The master device 20 may perform S70 to S130 described above for each communication event, or may perform S70 to S130 every time multiple communication events have been executed.

Figure 5:
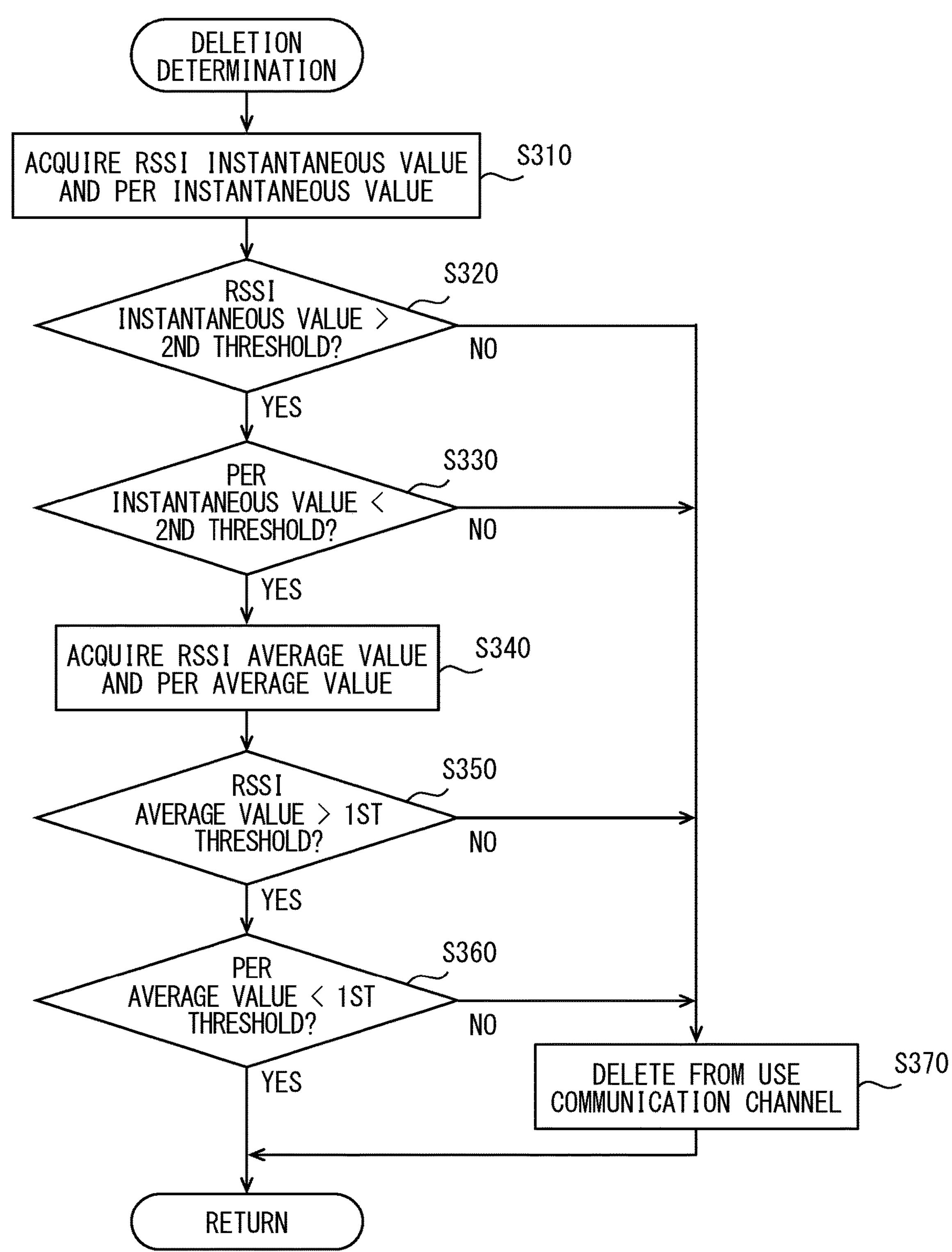
FIG. 5 is a flowchart showing a detailed example of a communication channel deletion determination process according to the first embodiment.

The above-described communication channel deletion determination process will be described in detail with reference to the flowchart of FIG. 5. The flowchart of FIG. 5 illustrates a detailed example of communication channel deletion determination process.

Figure 6:
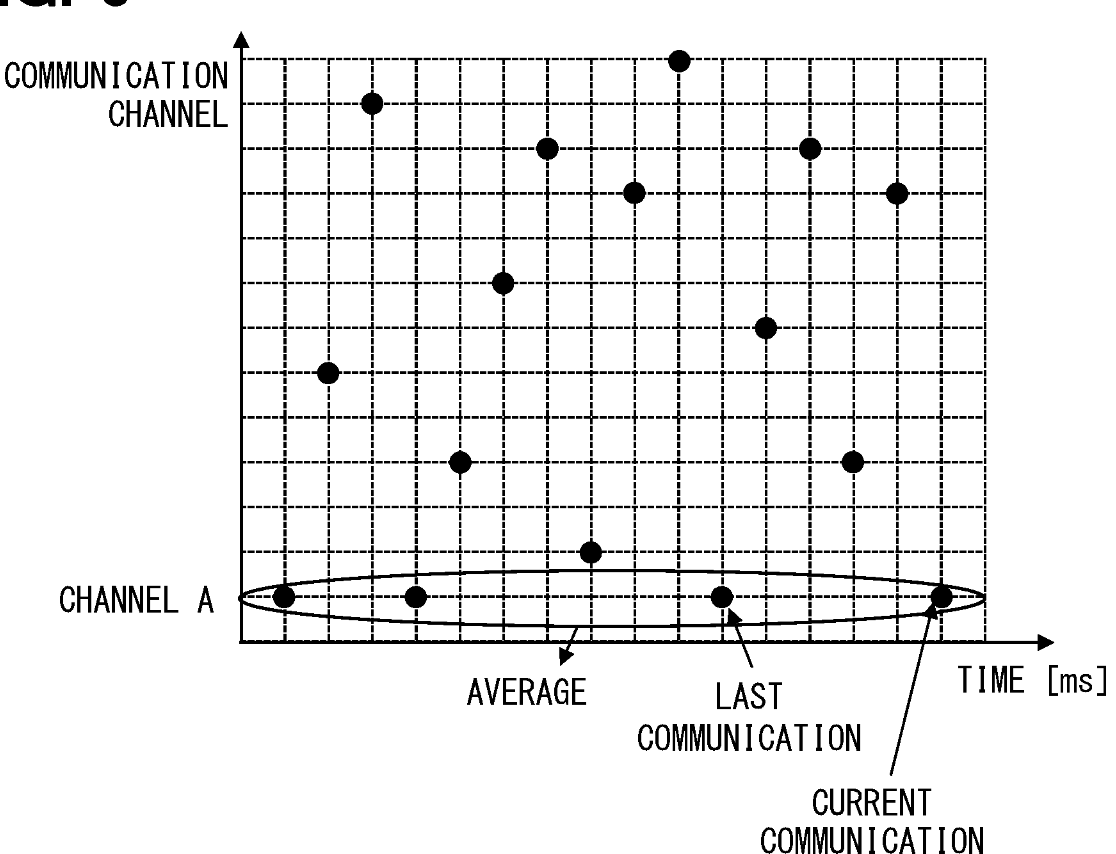
FIG. 6 is a diagram showing an example in which one communication channel is sequentially selected from multiple data communication channels by frequency channel hopping in each communication event.

In S310, the master device 20 acquires instantaneous value of RSSI, which corresponds to the first characteristic data indicating communication quality, and instantaneous value of PER, which corresponds to the second characteristic data indicating communication quality. The instantaneous values of RSSI and PER correspond to second evaluation data in the present disclosure, and corresponds to a value indicating changes in RSSI and PER with high responsiveness. For example, as illustrated in FIG. 6, for each communication event, the master device 20 and the slave device 30 execute wireless communication using one communication channel, which is sequentially selected from multiple data communication channels by frequency channel hopping. Focusing on the communication channel A illustrated in FIG. 6, the instantaneous value of RSSI and the instantaneous value of PER may be the RSSI value and the PER value detected in the current communication. Alternatively, the instantaneous value of RSSI and the instantaneous value of PER may be the RSSI value and the PER value detected in the previous communication. The instantaneous value of RSSI may be an average value of multiple RSSI values detected in the current communication and previous communications, and the instantaneous value of PER may be an average value of multiple PER values detected in the current communication and previous communications. In any case, the instantaneous values of RSSI and PER may be based on a smaller number of RSSI values and PER values than the average values of RSSI and PER corresponding to the first evaluation data described later. Accordingly, the instantaneous values of RSSI and PER can indicate the communication quality of wireless communication between the master device 20 and the slave device 30 with higher responsiveness and higher real-time performance than the average values of RSSI and PER.

In S320, the master device 20 determines whether the instantaneous value of RSSI is larger than a second threshold value related to RSSI. In this determination process, when the instantaneous value of RSSI is larger than the second threshold value related to the RSSI, the master device 20 proceeds to S330. When the instantaneous value of RSSI is equal to or less than the second threshold value related to RSSI, the master device 20 proceeds to S370.

In S330, the master device 20 determines whether the instantaneous value of PER is smaller than the second threshold value related to the PER. In this determination process, when the instantaneous value of PER is smaller than the second threshold value related to the PER, the master device 20 proceeds to S340. When the instantaneous value of PER is equal to or greater than the second threshold value related to the PER, the master device 20 proceeds to S370.

In S340, the master device 20 acquires the average value of RSSI and the average value of PER, which are characteristic data indicating the communication quality. The average values of RSSI and the PER correspond to first evaluation data in the present disclosure, and correspond to values that stably indicate changes in RSSI and PER. For example, with respect to the communication channel A shown in FIG. 6, the average value of RSSI may be the average value of RSSI values detected in the past four communications, and the average value of PER may be the average value of PER values detected in the past four communications. The number of RSSI values and PER values to be averaged is not limited to four, and may be more or less than four. The number of RSSI values and PER values for obtaining the average values of RSSI and PER is set to be larger than the number of RSSI values and PER values for obtaining the instantaneous values of RSSI and PER. The average value may be obtained by a simple average, or may be obtained by a weighted average in which more recent values are emphasized. Further, the first evaluation data is not limited to the average value of RSSI and the average value of PER. For example, a median value or the like as long as it stably indicates changes in the RSSI and the PER based on multiple RSSI values and RER values may be used as the first evaluation data.

In S350, the master device 20 determines whether the average value of RSSI is larger than a first threshold value related to RSSI. The first threshold value related to RSSI is set to be larger than the above-described second threshold value related to RSSI. In this determination process, when the average value of RSSI is determined to be larger than the first threshold value related to RSSI, the master device 20 proceeds to S360. In S350, when the average value of RSSI is determined to be equal to or less than the first threshold value related to RSSI, the master device 20 proceeds to S370.

In S360, the master device 20 determines whether the average value of PER is smaller than the first threshold value related to PER. The first threshold value related to PER is set to be smaller than the above-described second threshold value related to PER. In this determination process, when the average value of PERs is determined to be smaller than the first threshold value related to the PER, the master device 20 ends the deletion determination process. In this case, it can be considered that the communication quality of communication channel is not degraded, and thus the communication channel is not deleted. On the other hand, when the average value of PER is determined to be equal to or greater than the first threshold value related to PER, the master device 20 proceeds to S370.

In S370, the master device 20 determines the communication channel whose RSSI and PER have been detected as a communication channel with deteriorated communication quality, deletes this communication channel from the communication channels to be used for wireless communication.

Figure 7:
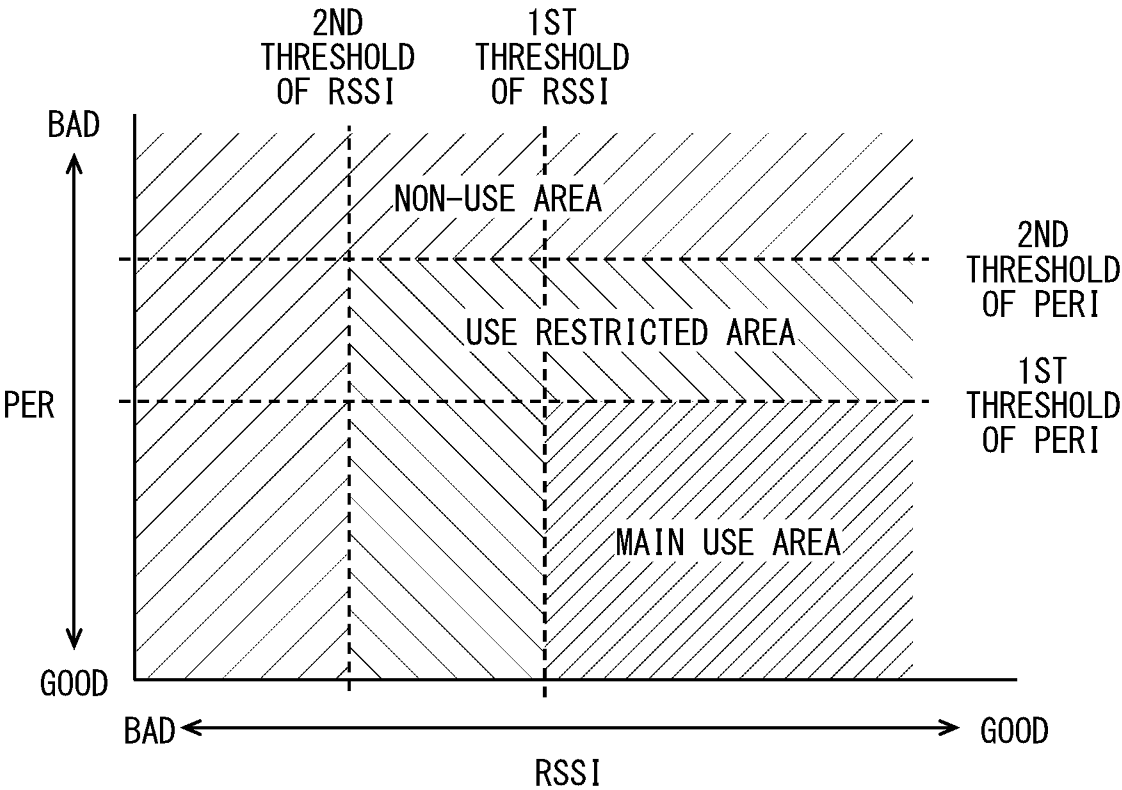
FIG. 7 is a diagram showing that two types of threshold values are determined for each of RSSI and PER, which are characteristic data indicating communication quality.

As described above, in the present embodiment, as shown in FIG. 7, two types of data, RSSI and PER, are detected as characteristic data indicating the communication quality of communication channel. Then, two types of threshold values (the first threshold value related to RSSI, the second threshold value related to RSSI, the first threshold value related to PER, and the second threshold value related to PER) are determined for each of detected RSSI and detected PER.

The first threshold related to RSSI is set to be greater than the second threshold related to RSSI. The higher value of RSSI indicates the higher communication quality. That is, the first threshold value related to RSSI is used to determine a slight decrease in communication quality, and the second threshold value related to RSSI is used to determine a greater decrease in communication quality than the first threshold value related to RSSI. The first threshold value related to PER is set to be smaller than the second threshold value related to PER. The smaller value of PER indicates the higher communication quality. That is, the first threshold value related to PER is used to determine a slight decrease in communication quality, and the second threshold value related to PER is used to determine a greater decrease in communication quality than the first threshold value related to PER.

In the present embodiment, as shown in the flowchart of FIG. 5, regarding the RSSI, the average value of RSSI is compared with the first threshold value related to RSSI. When the average value of RSSI becomes to (or falls below) the first threshold value related to RSSI, it is determined that a first condition for the RSSI indicating the deterioration of communication quality is satisfied, and the communication channel is deleted. The instantaneous value of RSSI is compared with the second threshold value related to RSSI. When the instantaneous value of RSSI becomes to (or falls below) the second threshold value related to RSSI, it is determined that a second condition for the RSSI indicating the deterioration of communication quality is satisfied, and the communication channel is deleted.

Similarly, with respect to the PER, the average value of PER is compared with the first threshold value related to PER. When the average value of PER becomes to (or exceeds) the first threshold value related to PER, it is determined that a first condition for the PER indicating the deterioration of communication quality is satisfied, and the communication channel is deleted. The instantaneous value of PER is compared with the second threshold value related to PER. When the instantaneous value of PER becomes to (exceeds) the second threshold value related to PER, it is determined that a second condition for the PER indicating the deterioration of communication quality is satisfied, and the communication channel is deleted.

Figure 8:
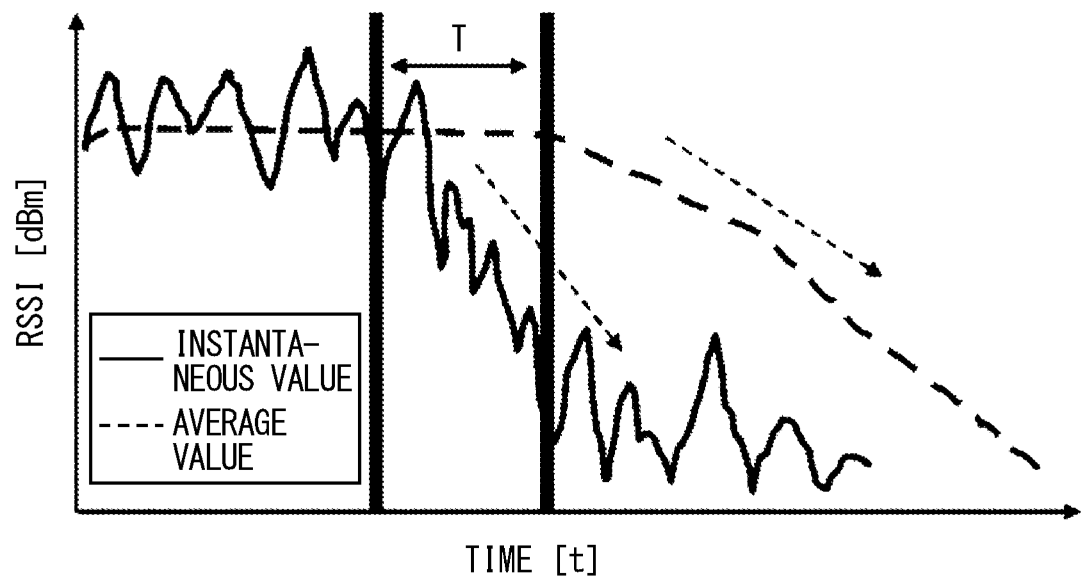
FIG. 8 is a diagram showing an example of a change in an instantaneous value of RSSI and an average value of RSSI.

The communication quality of communication channel degrades in various modes. For example, in a case where the communication quality rapidly degrades, it takes time until the change appears in the average value. In this case, if the determination is made only by the average value, a time delay may occur until the degradation of the communication quality can be determined. As an example, as illustrated in FIG. 8, even when the instantaneous value of RSSI rapidly decreases, the average value of RSSI hardly changes until the period T elapses, and starts to decrease after elapse of the period T. The instantaneous value indicates a decrease in communication quality with higher responsiveness than the average value, but may greatly fluctuate due to the influence of external noise or the like.

In the present embodiment, the average values of RSSI and the PER are compared with the respective first threshold values indicating a relatively small decrease in communication quality, and the instantaneous values of RSSI and the PER are compared with the respective second threshold values indicating a relatively large decrease in communication quality. As a result, even when the instantaneous values of RSSI and PER fluctuate due to external noise or the like, it is not determined that the communication quality has deteriorated unless the instantaneous values reach the second threshold values indicating a relatively large deterioration in communication quality. Thus, it is possible to suppress erroneous determination of deterioration in communication quality due to external noise or the like with high reliability. When the communication quality actually decreases and the decrease in the communication quality rapidly occurs, the rapid decrease in the communication quality can be determined without delay by using the instantaneous values having excellent responsiveness compared with the average values. However, when the deterioration degree of communication quality is small but the deteriorated state continues for a while, there is a possibility that the deterioration of communication quality cannot be determined at an appropriate time by the determination based on the instantaneous values. In this regard, in the present embodiment, the average value is compared with the first threshold value that is smaller than the second threshold value and indicates a decrease in communication quality. Thus, it is possible to appropriately determine even when the deterioration degree of communication quality is small but the deteriorated state continues for predetermined period.

As described above, according to the present embodiment, it is possible to accurately determine deterioration in communication quality due to various aspects, such as a case where the deterioration degree of communication quality is small but the deteriorated state continues for a while or a case where the communication quality rapidly deteriorates. Further, with the present disclosure, the communication channel for which the communication quality is determined to be deteriorated can be excluded from the communication channels for performing wireless communication.

In FIG. 7, an area in which the RSSI is larger than the first threshold value related to RSSI and the PER is smaller than the first threshold value related to PER has high communication quality, and is used for the wireless communication between the master device 20 and the slave device 30. Thus, this area is indicated as a main use area. An area in which the RSSI is smaller than the first threshold value related to RSSI but larger than the second threshold value related to RSSI and/or the PER is larger than the first threshold value related to PER but smaller than the second threshold value related to PER is used for the wireless communication only when the average values of both RSSI and PER are not included in this area. Thus, this area is indicated as a use restricted area. Further, an area in which the RSSI is smaller than the second threshold value related to RSSI and/or the PER is larger than the second threshold value related to PER is indicated as a non-use area because the communication quality is significantly deteriorated in this area.

Second Embodiment

Next, a wireless communication system according to a second embodiment of the present disclosure will be described with reference to the drawings. Since the wireless communication system according to the present embodiment has similar configuration to the wireless communication system of the first embodiment, description of the similar configuration will be omitted.

The wireless communication system according to the present embodiment differs from the wireless communication system according to the first embodiment only in the communication channel deletion determination process. The deletion determination process performed in the wireless communication system according to the present embodiment will be described below with reference to the flowchart of FIG. 9. The process executed in S410 to S440 in the flowchart of FIG. 9 is the same as the process executed in S310 to S340 of the flowchart shown in FIG. 5, and thus description thereof will be omitted.

In S450, the master device 20 determines whether the instantaneous value of RSSI is larger than the average value of RSSI. In this determination process, when the instantaneous value of RSSI is determined to be larger than the average value of RSSI, the master device 20 proceeds to S460. In S450, when the instantaneous value of RSSI is determined to be equal to or less than the average value of RSSI, the master device 20 proceeds to S470.

In S460, the master device 20 determines whether the instantaneous value of PER is smaller than the average value of PER. In this determination process, when the instantaneous value of PER is determined to be smaller than the average value of PER, the master device 20 ends the deletion determination process. That is, with respect to the RSSI and the PER, since the instantaneous value having better responsiveness than the average value indicates better communication quality than the average value, it can be considered that the communication quality is not deteriorated. Therefore, in this case, the communication channel is not deleted.

When the instantaneous value of PER is determined to be equal to or greater than the average value of PER, the master device 20 proceeds to S480.

In S470, the master device 20 determines whether the instantaneous value of PER is equal to or greater than the average value of PER. In this determination process, when the master device 20 determines that the instantaneous value of PER is smaller than the average value of PER, the process proceeds to S480. In S470, when the master device 20 determines that the instantaneous value of PER is equal to or greater than the average value of PER, the process proceeds to S500.

In S480, the master device 20 acquires the previous value and the current value (see FIG. 6) of RSSI that correspond to the first characteristic data indicating the communication quality. Then, in S490, the master device 20 determines whether the communication quality indicated by the current value is more deteriorated than that indicated by the previous value based on the magnitude relationship between the previous value and the current value of RSSI. In this determination process, when the current value of RSSI is determined to be smaller than the previous value, that is, the current value of RSSI indicates that the communication quality is worse than the communication quality indicated by the previous value, the process proceeds to S500. In S490, when the current value of RSSI indicates that the communication quality is not deteriorated as compared with the previous value, the master device 20 ends the deletion determination process without deleting the communication channel. In S490, instead of or in addition to the RSSI corresponding to the first characteristic data, the magnitude relationship between the previous value and the current value may be determined for PER, which correspond to the second characteristic data.

In S500, the master device 20 determines the communication channel, for which RSSI and PER are detected, as a communication channel whose communication quality has deteriorated, and deletes this communication channel from the communication channels to be used for the wireless communication. In the present embodiment, the communication channel is deleted in (i) the first case where a condition that the instantaneous value of RSSI is smaller than the average value and the instantaneous value of PER is equal to or larger than the average value is satisfied and in (ii) the second case where a condition that either the instantaneous value of RSSI is smaller than the average value or the instantaneous value of PER is equal to or larger than the average value is satisfied and the communication quality indicated by the current value of RSSI, which corresponds to the first characteristic data indicating the communication quality, is worse than that of the previous value is satisfied.

In the first case, the fact that the instantaneous value of RSSI is smaller than the average value indicates that the instantaneous value of RSSI indicates lower communication quality than that of the average value. The fact that the instantaneous value of PER is equal to or greater than the average value also indicates that the instantaneous value of PER indicates lower communication quality than that of the average value. Therefore, in the first case where such a condition is satisfied, it is considered that the first condition for determining communication quality degradation related to RSSI is satisfied in the determination based on the average value, which corresponds to the first evaluation data of RSSI, and/or the first condition for determining communication quality degradation related to PER is satisfied in the determination based on the average value, which correspond to the first evaluation data of PER. Thus, the communication channel is deleted in S500 accordingly.

In the second case, when one of the conditions that the instantaneous value of RSSI is smaller than the average value or that the instantaneous value of PER is equal to or larger than the average value is satisfied, but the remaining one condition is not satisfied, it is difficult to determine that the communication quality is deteriorated only based on these two conditions. Therefore, the master device 20 further determines whether the current value of RSSI, which corresponds to the first characteristic data indicating the communication quality, is smaller than the previous value, that is, whether the current value of RSSI indicates the lower communication quality than the previous value. When the current value of RSSI indicates that the communication quality is lower than that indicated by the previous value, the master device 20 determines that the first condition is satisfied in the determination based on the average value of RSSI or PER, and deletes the communication channel in S500.

According to the deletion determination process of the second embodiment, it is possible to obtain the same operation and effect as those of the first embodiment.

In the present disclosure, the processor 211 of master device 20 performs the process shown in FIG. 4, FIG. 5 and FIG. 9, by executing program codes stored in a computer-readable, non-transitory tangible storage medium, to implement functional blocks, such as, a detection unit (corresponding to S60), an evaluation data generation unit (corresponding to S310, S340, S410, S440), a determination unit (corresponding to S320, S330, S350, S360, S420, S430, S450, S460, S470), and a decision unit (corresponding to S370, S500).

Although embodiments of the present disclosure have been described above, the present disclosure is not limited to the above-described embodiments, and various modifications can be made without departing from the spirit of the present disclosure. Modifications of the present disclosure will be described below.

First Modification

In the first embodiment described above, as an example, the RSSI is used as the first characteristic data indicating the communication quality and the PER is used as the second characteristic data indicating the communication quality. That is, two types of characteristic data are used as an example. Alternatively, the characteristic data indicating the communication quality may be only one type instead of two or more types as described in the first embodiment.

Second Modification

In the first embodiment and the second embodiment described above, when the communication quality is determined to be deteriorated based on the characteristic data (RSSI, PER, or the like) indicating the communication quality, only the communication channel, which performs the communication from which the characteristic data is detected, is deleted.

The communication channel to be deleted from the communication channels for performing the wireless communication between the master device 20 and the slave device 30 due to deterioration of communication quality may additionally include a communication channel in the vicinity of the communication channel for which the communication quality is determined to be deteriorated based on the evaluation data (average value, instantaneous value) of the detected characteristic data (RSSI, PER, or the like). This is because, when the communication quality of one communication channel is determined to be deteriorated, the communication quality of communication channel having a frequency in the vicinity thereof is generally likely to exhibit the same tendency.

In this case, for example, in the determination based on the average value and the instantaneous value, which correspond to the evaluation data, all of the determinations are performed regardless of the individual determination results, and it is considered that the deterioration degree of communication quality is larger as the number of determination results satisfying the first condition and the second condition is larger. Therefore, the number of communication channels to be deleted may be increased among the communication channels having frequencies close to each other.

When the average value reaches the first threshold value, it is considered that the deterioration degree of communication quality is smaller than that when the instantaneous value reaches the second threshold value. Therefore, when the average value reaches the first threshold value, only the communication channel, which performs the communication from which the characteristic data is detected, may be deleted. When the instantaneous value reaches the second threshold value, the communication channel having frequency in the vicinity of the communication channel from which the characteristic data is detected may be deleted together.

Third Modification

In the first embodiment and the second embodiment described above, PER is used as the second characteristic data. Instead of the packet error rate, a packet arrival rate (PAR) which is a success rate of packet communication may be used. When the PAR is used, the magnitude relationship with the threshold value and the magnitude relationship between the average value and the instantaneous value are opposite to above-described relationships in the first and second embodiments.

Fourth Modification

As described in the first embodiment, the wireless communication system 10 according to the present disclosure can be applied to, for example, a battery management system of a battery pack mounted on a vehicle. In this case, both the master device 20 and the slave device 30 of the wireless communication system 10 are mounted on the vehicle.

As described above, the communication environment between the master device 20 and the slave device 30 is affected by interference between a transmission wave and a reflected wave, interference with external noise, and the like. The influence of interference due to the reflected wave or the external noise is not always constant, and fluctuates depending on vibration due to traveling of vehicle or a change in the vehicle position. When the magnitude of fluctuation is considered, the change in the communication environment is considered to be large when the degree of vibration due to traveling of vehicle or the change in the vehicle position is large, and conversely, the change in the communication environment is small when the degree of vibration due to the traveling of vehicle or the change in the vehicle position is small.

Therefore, by changing the first condition only, the second condition only, or both of the first condition or the second condition, which is set for determining the deterioration of communication quality, according to the magnitude of change in the communication environment, it is possible to further improve the determination accuracy of the communication channel whose communication quality is deteriorated.

For example, when (i) the vehicle is stopped, (ii) the vehicle is traveling at a low speed less than a predetermined threshold value, or (iii) vibration generated in the vehicle is small, the state of vehicle can be regarded as a state in which a change in the communication environment between the master device 20 and the slave device 30 is small. On the other hand, when (i) the vehicle is traveling at a speed equal to or higher than the threshold value or (ii) the vibration generated in the vehicle is large, the state of vehicle can be regarded as a state in which the change in the communication environment between the master device 20 and the slave device 30 is large.

In a case where the change in the communication environment is considered to be small, (i) the first condition only, (ii) the second condition only, or (iii) both of the first condition and the second condition may be changed to be more relaxed than in a case where the change in the communication environment is considered to be large. This is because when the change in the communication environment is small, the necessity of sensitively detecting the deterioration of communication environment is reduced. Note that "changing the first condition or the second condition so as to be relaxed" indicates changing at least one of the first condition or the second condition so that the changed condition is not satisfied unless the communication quality decreases more significantly. In a case where the change in the communication environment is considered to be small, a change may be made so as to determine a larger decrease in the communication quality by relaxing at least the second condition compared to a case where the change in the communication environment is considered to be large. This is because the second condition is a condition set for determining a decrease in communication quality based on the second evaluation data, which has better responsiveness than the first evaluation data.

Fifth Modification

When the wireless communication system 10 according to the present disclosure is applied to a battery management system of a battery pack mounted on a vehicle, the master device 20 and the slave device 30 communicate multiple different types of data such as request data of battery information, acquired battery information, and abnormality information of various sensors and monitoring devices as described above. In general, when the types of data are different, the importance of each data type is often different. For example, abnormality information of various sensors and monitoring devices is more important than periodically transmitted battery information. Such data of high importance may be transmitted using a communication channel with higher reliability, that is, with higher communication quality. In the above example, the first data for which more reliable communication is required may correspond to the abnormality information, and the second data for which communication of lower quality than the first data is acceptable may correspond to the battery information.

Therefore, at least one of the first condition or the second condition for determining the deterioration of communication quality may be changed according to the type of the data to be communicated. Accordingly, for example, data with high importance may be communicated using a communication channel with high communication quality, and data with low importance may be communicated using a communication channel with communication quality equal to or higher than normal level. As an example of changing at least one of the first condition or the second condition, it is conceivable to change at least one of the first condition or the second condition for selecting the communication channel for communicating the first data so as to determine a smaller decrease in communication quality than the first condition or the second condition for selecting the communication channel for communicating the second data. Alternatively, at least one of the first condition or the second condition for selecting the communication channel for communicating the second data may be changed to determine a larger decrease in communication quality than the first condition and the second condition for selecting the communication channel for communicating the first data.

Sixth Modification

When the wireless communication system 10 of the present disclosure is mounted on a vehicle, the vehicle may have various states, such as a stopped state in which a main switch of the vehicle is turned off, an activated state in which the main switch is turned on, and a driving state including traveling state and parked state of the vehicle. The state of the vehicle may be either a normal state in which various vehicle devices mounted on the vehicle are operating normally or an abnormal state in which an abnormality has occurred in one of the vehicle devices.

In a start-up state immediately after the main switch is turned on or in an abnormal state in which an abnormality occurs in one of the vehicle devices, noise from other vehicle devices may increase. Therefore, the characteristic data indicating the quality of communication between the master device 20 and the slave device 30 acquired in such a state may not correctly indicate the communication quality.

Therefore, a state in which noise from other vehicle devices may increase, such as the above-described start-up state or abnormal state, may be defined as an unsteady state. When the state of vehicle corresponds to a predetermined unsteady state, the detected characteristic data may be excluded from the characteristic data for generating the first evaluation data and the second evaluation data. Further, when the state of vehicle becomes the predetermined unsteady state, the characteristic data detected and accumulated so far may be initialized by data reset, and the collection of characteristic data may be started again after the unsteady state is eliminated.

The modifications of the above-described embodiments may be implemented in proper combination.

The present disclosure discloses multiple technical ideas listed below and multiple combinations thereof. Combinations of the following technical ideas apply not only to the wireless communication system but also to the wireless communication method.

What is claimed is:

1. A wireless communication system executing a wireless communication between a master device and a slave device using a communication channel, which is sequentially selected from multiple communication channels, the wireless communication system comprising:

a detection unit detecting characteristic data indicating a communication quality of the wireless communication for each of the multiple communication channels;

an evaluation data generation unit generating, for each of the multiple communication channels, first evaluation data and second evaluation data, based on the characteristic data detected by the detection unit, the second evaluation data having a higher responsiveness to a change occurred in the characteristic data compared with the first evaluation data;

a determination unit determining deterioration of the communication quality for each of the multiple communication channels based on the first evaluation data and the second evaluation data generated by the evaluation data generation unit; and a decision unit deciding one of the multiple communication channels whose communication quality is determined to be deteriorated by the determination unit as a communication channel to be excluded from the multiple communication channels for performing the wireless communication, wherein the determination unit determines, for each of the multiple communication channels, that the communication quality is deteriorated in response to at least one of (i) a first condition indicating a predetermined deterioration of communication quality being satisfied in a determination based on the first evaluation data or (ii) a second condition indicating a greater deterioration of communication quality than the first condition being satisfied in a determination based on the second evaluation data.

2. The wireless communication system according to claim 1, wherein the multiple communication channels include a first channel group and a second channel group, the first channel group includes multiple communication channels to be used in a connection establishment process for establishing a communication connection between the master device and the slave device, the second channel group includes multiple communication channels to be used in a communication process for performing data communication between the master device and the slave device, and the communication channel to be excluded by the decision unit from the multiple communication channels is one of the communication channels included in the second channel group.

3. The wireless communication system according to claim 1, wherein the detection unit detects, as the characteristic data, first characteristic data and second characteristic data, which have different data types from one another, the evaluation data generation unit generates the first evaluation data related to the first characteristic data, the first evaluation data related to the second characteristic data, the second evaluation data related to the first characteristic data, and the second evaluation data related to the second characteristic data, the determination unit determines the first condition related to the first characteristic data, the second condition related to the first characteristic data, the first condition related to the second characteristic data, and the second condition related to the second characteristic data, and the determination unit determines, for each of the multiple communication channels, that the communication quality is deteriorated in response to at least one of (i) the first condition related to the first characteristic data being satisfied in the determination based on the first evaluation data related to the first characteristic data, (ii) the second condition related to the first characteristic data being satisfied in the determination based on the second evaluation data related to the first characteristic data, (iii) the first condition related to the second characteristic data being satisfied in the determination based on the first evaluation data related to the second characteristic data, or (iv) the second condition related to the second characteristic data being satisfied in the determination based on the second evaluation data related to the second characteristic data.

4. The wireless communication system according to claim 3, wherein the wireless communication is packet communication, the first characteristic data is a received signal strength of the packet communication or a signal-to-noise ratio/signal interference noise ratio of the packet communication, and the second characteristic data is one of a packet error rate, a packet arrival rate, or a bit error rate of the packet communication.

5. The wireless communication system according to claim 3, wherein the determination unit:

compares the first evaluation data related to the first characteristic data with a first threshold value related to the first characteristic data;

in response to the first evaluation data related to the first characteristic data reaching the first threshold value related to the first characteristic data, determines that the first condition related to the first characteristic data is satisfied in the determination based on the first evaluation data related to the first characteristic data;

compares the second evaluation data related to the first characteristic data with a second threshold value related to the first characteristic data, the second threshold value related to the first characteristic data indicating a greater deterioration of communication quality than the first threshold value related to the first characteristic data;

in response to the second evaluation data related to the first characteristic data reaching the second threshold value related to the first characteristic data, determines that the second condition related to the first characteristic data is satisfied in the determination based on the second evaluation data related to the first characteristic data;

compares the first evaluation data related to the second characteristic data with a first threshold value related to the second characteristic data;

in response to the first evaluation data related to the second characteristic data reaching the first threshold value related to the second characteristic data, determines that the first condition related to the second characteristic data is satisfied in the determination based on the first evaluation data related to the second characteristic data;

compares the second evaluation data related to the second characteristic data with a second threshold value related to the second characteristic data, the second threshold value related to the second characteristic data indicating a greater deterioration of communication quality than the first threshold value related to the second characteristic data; and in response to the second evaluation data related to the second characteristic data reaching the second threshold value related to the second characteristic data, determines that the second condition related to the second characteristic data is satisfied in the determination based on the second evaluation data related to the second characteristic data.

6. The wireless communication system according to claim 3, wherein, in a case where (i) the determination unit compares the first evaluation data related to the first characteristic data with the second evaluation data related to the first characteristic data and a comparison result indicates that the second evaluation data indicates a greater deterioration of communication quality than that of the first evaluation data, and (ii) the determination unit compares the first evaluation data related to the second characteristic data with the second evaluation data related to the second characteristic data and a comparison result indicates that the second evaluation data indicates a greater deterioration of communication quality than that of the first evaluation data, the determination unit determines that (i) the first condition related to the first characteristic data is satisfied in the determination based on the first evaluation data related to the first characteristic data and/or (ii) the first condition related to the second characteristic data is regarded to be satisfied in the determination based on the first evaluation data related to the second characteristic data.

7. The wireless communication system according to claim 3, wherein, in a case where (i) the determination unit compares the first evaluation data related to the first characteristic data with the second evaluation data related to the first characteristic data and a comparison result indicates that the second evaluation data indicates a greater deterioration of communication quality than that of the first evaluation data, or (ii) the determination unit compares the first evaluation data related to the second characteristic data with the second evaluation data related to the second characteristic data and a comparison result indicates that the second evaluation data indicates a greater deterioration of communication quality than that of the first evaluation data, the determination unit further determines whether latest characteristic data indicates a deterioration tendency of communication quality for at least one of the first characteristic data or the second characteristic data, and the determination unit determines that the first condition is regarded to be satisfied in response to the latest characteristic data indicating the deterioration tendency of communication quality in the determination based on the first evaluation data related to the first characteristic data or the second evaluation data related to the first characteristic data.

8. The wireless communication system according to claim 1, wherein the communication channel to be excluded from the multiple communication channels by the decision unit in response to the communication quality being regarded to be deteriorated includes, in addition to the communication channel whose communication quality is determined to be deteriorated based on the first evaluation data related to the detected characteristic data and the second evaluation data related to the detected characteristic data, a neighboring communication channel of the communication channel whose communication quality is determined to be deteriorated.

9. The wireless communication system according to claim 8, wherein a quantity of the communication channels to be excluded by the decision unit in response to the communication quality being regarded to be deteriorated is set to be increased as an increase in count of determinations indicating the first condition and the second condition being satisfied in the determination based on the first evaluation data and the second evaluation data.

10. The wireless communication system according to claim 1, wherein the master device or the slave device is mounted on a moving object.

11. The wireless communication system according to claim 10, wherein the moving object is a vehicle.

12. The wireless communication system according to claim 11, wherein the determination unit changes at least one of the first condition or the second condition according to a state of the vehicle.

13. The wireless communication system according to claim 12, wherein, in a case where the state of the vehicle indicates that an environment change of the wireless communication between the master device and the slave device is regarded to be small, the determination unit changes at least the second condition to determine a greater deterioration of communication quality compared to a case where the environment change is regarded to be large.

14. The wireless communication system according to claim 11, wherein the master device and the slave device communicate multiple different types of data, and the determination unit changes at least one of the first condition or the second condition according to the type of data to be communicated between the master device and the slave device.

15. The wireless communication system according to claim 14, wherein the multiple different types of data include first data that requires a highly reliable communication and second data that permits a lower communication quality than that of the first data, and the determination unit changes at least one of the first condition or the second condition in a manner that at least one of the first condition or the second condition set for selecting the communication channel of the first data determines a smaller deterioration of communication quality than the first condition and the second condition set for selecting the communication channel of the second data.

16. The wireless communication system according to claim 11, wherein the evaluation data generation unit excludes the characteristic data detected by the detection unit from the characteristic data for generating the first evaluation data and the second evaluation data when a state of the vehicle corresponds to a predetermined unsteady state.

17. The wireless communication system according to claim 16, wherein the predetermined unsteady state includes at least one of (i) an activation state immediately after a main switch of the vehicle is operated or (ii) an abnormality occurrence state in which an abnormality occurs in a vehicle device mounted on the vehicle.

18. A wireless communication method of executing a wireless communication between a master device and a slave device using a communication channel, which is sequentially selected from multiple communication channels, the wireless communication method comprising:

detecting characteristic data indicating a communication quality of the wireless communication for each of the multiple communication channels;

generating, for each of the multiple communication channels, first evaluation data and second evaluation data, based on the detected characteristic data, the second evaluation data having a higher responsiveness to a change occurred in the characteristic data compared with the first evaluation data;

determining deterioration of the communication quality for each of the multiple communication channels based on the generated first evaluation data and the generated second evaluation data, wherein, for each of the multiple communication channels, the communication quality is determined to be deteriorated in response to at least one of (i) a first condition indicating a predetermined deterioration of communication quality being satisfied in a determination based on the first evaluation data or (ii) a second condition indicating a greater deterioration of communication quality than the first condition being satisfied in a determination based on the second evaluation data; and deciding one of the multiple communication channels whose communication quality is determined to be deteriorated, as a communication channel to be excluded from the multiple communication channels for performing the wireless communication.

19. A wireless communication system executing a wireless communication between a master device and a slave device using a communication channel, which is sequentially selected from multiple communication channels, the wireless communication system comprising:

a computer-readable non-transitory storage medium; and a microcomputer, by executing program code stored in the computer-readable non-transitory storage medium, configured to:

detect characteristic data indicating a communication quality of the wireless communication for each of the multiple communication channels;

generate, for each of the multiple communication channels, first evaluation data and second evaluation data, based on the detected characteristic data, the second evaluation data having a higher responsiveness to a change occurred in the characteristic data compared with the first evaluation data;

determine deterioration of the communication quality for each of the multiple communication channels based on the generated first evaluation data and the generated second evaluation data, wherein, for each of the multiple communication channels, the communication quality is determined to be deteriorated in response to at least one of (i) a first condition indicating a predetermined deterioration of communication quality being satisfied in a determination based on the first evaluation data or (ii) a second condition indicating a greater deterioration of communication quality than the first condition being satisfied in a determination based on the second evaluation data; and decide one of the multiple communication channels whose communication quality is determined to be deteriorated, as a communication channel to be excluded from the multiple communication channels for performing the wireless communication.

* * * * *